US011975229B2

(12) United States Patent
Lackore, Jr. et al.

(10) Patent No.: US 11,975,229 B2
(45) Date of Patent: May 7, 2024

(54) FIRE SUPPRESSION SYSTEM

(71) Applicant: E-One, Inc., Ocala, FL (US)

(72) Inventors: James Roger Lackore, Jr., Big Bend, WI (US); Stephen B. Swayze, Hernando, FL (US)

(73) Assignee: E-One, Inc., Ocala, FL (US)

( * ) Notice: Subject to any disclaimer, the term of this patent is extended or adjusted under 35 U.S.C. 154(b) by 390 days.

(21) Appl. No.: 17/153,118

(22) Filed: Jan. 20, 2021

(65) Prior Publication Data

US 2021/0220686 A1 Jul. 22, 2021

Related U.S. Application Data

(60) Provisional application No. 62/963,286, filed on Jan. 20, 2020.

(51) Int. Cl.
*A62C 99/00* (2010.01)
*A62C 35/02* (2006.01)

(52) U.S. Cl.
CPC ........ *A62C 99/0036* (2013.01); *A62C 35/026* (2013.01)

(58) Field of Classification Search
CPC ... A62C 99/0036; A62C 35/026; A62C 37/50; A62C 5/02; A62C 31/12; A62C 27/00
USPC .......................................................... 169/44
See application file for complete search history.

(56) References Cited

U.S. PATENT DOCUMENTS 5,004,155 A * 4/1991 Dashevsky ............... B05B 7/32 417/427
5,284,174 A 2/1994 Norman
5,764,463 A * 6/1998 Arvidson ................. A62C 5/02 361/23
6,615,675 B1 9/2003 Kudo et al.
6,659,187 B1 12/2003 Crabtree et al.
7,337,857 B2 * 3/2008 Vonhof .................... A62C 5/02 169/44
7,513,315 B2 4/2009 Boyle et al.
(Continued)

OTHER PUBLICATIONS

Fire Apparatus Manufacturers' Association, "FAMA Buyers Guide TC030 Fire Apparatus Foam and Water Additive Proportioning Systems," accessed Dec. 5, 2019 (12 pages).
(Continued)

*Primary Examiner* — Joseph A Greenlund
*Assistant Examiner* — Kevin Edward Schwartz
(74) *Attorney, Agent, or Firm* — Michael Best & Friedrich LLP

(57) ABSTRACT

Systems and methods for fire suppression systems are disclosed. The methods may include operating the fire suppression system in a first configuration. The methods may further include shifting the fire suppression system from the first configuration to a second configuration in which pumping of foam concentrate to the upstream side of the water pump is stopped and in which foam concentrate is pumped to a downstream side of the water pump. The fire suppression system may be operated in the second configuration whereby a portion of the water pumped from the water pump is combined with foam concentrate to supply a first one of the plurality of manifolds, and another portion of the water pumped from the water pump is provided without foam concentrate to supply a second one of the plurality of manifolds.

22 Claims, 10 Drawing Sheets

(56) References Cited

U.S. PATENT DOCUMENTS

| | | | | |
|---|---|---|---|---|
| 7,878,703 | B2 | 2/2011 | Roberts | |
| 8,297,369 | B2 | 10/2012 | Gamble et al. | |
| 8,479,593 | B1 | 7/2013 | Kudo | |
| 8,485,045 | B1 | 7/2013 | Kudo | |
| 8,701,789 | B2 | 4/2014 | Kruger et al. | |
| 8,789,614 | B2 * | 7/2014 | Hosfield | A62C 31/00 169/44 |
| 9,149,671 | B2 | 10/2015 | Hosfield et al. | |
| 9,625,915 | B2 | 4/2017 | McLoughlin et al. | |
| 9,744,388 | B2 | 8/2017 | Ewers et al. | |
| 10,286,237 | B2 | 5/2019 | Laskaris et al. | |
| 11,065,490 | B2 * | 7/2021 | LaVergne | A62D 1/0085 |
| 2005/0023006 | A1 * | 2/2005 | Vonhof | A62C 5/02 169/44 |
| 2009/0134241 | A1 * | 5/2009 | Hoffmann | B05B 9/0403 239/112 |
| 2010/0065286 | A1 * | 3/2010 | Hosfield | A62C 27/00 169/13 |
| 2012/0000680 | A1 * | 1/2012 | Guse | A62C 25/00 169/44 |
| 2014/0352985 | A1 * | 12/2014 | McLoughlin | A62C 5/022 169/13 |
| 2016/0310771 | A1 * | 10/2016 | Laskaris | A62C 5/024 |
| 2018/0207462 | A1 | 7/2018 | Stephens et al. | |
| 2018/0221697 | A1 * | 8/2018 | Shively | A62C 37/50 |
| 2020/0215372 | A1 * | 7/2020 | LaVergne | A62D 1/0071 |

OTHER PUBLICATIONS

Rosenbauer, “Around-the-pump foam proportioning systems automatic foam premixing system,” <https://www.rosenbauer.com/en/svc/rosenbauer-world/products/fire-fighting-systems/foam-proportioning-systems/around-the-bump-foam-proportioning-systems> accessed Dec. 5, 2019 (2 pages).

* cited by examiner

FIRE SUPPRESSION SYSTEM

CROSS-REFERENCE TO RELATED APPLICATIONS

This application claims priority to U.S. Provisional Patent Application No. 62/963,286, filed Jan. 20, 2020, the entire contents of which are hereby incorporated by reference herein.

BACKGROUND

The invention relates generally to fire suppression systems including mixing of foam concentrate and water. Such systems and methods may be applied on various scales such as low flow rate systems utilizing lightweight electric motors to high flow rate systems found in fire suppression vehicles (e.g., fire trucks) and stationary systems in buildings.

Fire suppression systems are commonly used in industrial applications to combat fires in oil refineries, chemical plants, and other large facilities where highly flammable liquid materials are processed or stored. These fires are often fought by blanketing the flammable material with class B foam.

Industrial firefighting apparatus equipped for applying foam have used large water pumps and a plurality of discharge outlets. Foam concentrate has traditionally been injected in the vicinity of each discharge outlet. Each injection site is individually controlled to produce various proportions of water and foam concentrate. These systems are complex and expensive as they require precise application of foam concentrate at each discharge outlet. They also require large amounts of power to overcome the discharge pressure at the injection points.

Simpler "around the pump" systems draw foam concentrate into the water stream and circulate a foam concentrate-water mixture through a pump to avoid separate foam and mixture pumps.

SUMMARY

In one aspect, the invention provides a fire suppression system. The fire suppression system comprises: a water pump having an inlet coupled to a water supply line in fluid communication with a supply of water; a first foam line fluidly connecting an outlet side of the foam pump to the water supply line; a second foam line fluidly connecting an outlet side of the foam pump to a foam-concentrate water mixture line, where the foam-concentrate water mixture line has an outlet in fluid communication with a first manifold; and a second water line fluidly connecting the outlet side of the water pump to a second manifold. The fire suppression system is shiftable between a first configuration and a second configuration. In the first configuration: foam concentrate flows through the first foam line, water flows through the water supply line and mixes with the foam concentrate, and a foam concentrate-water mixture is passed into the first manifold through the foam-concentrate water mixture line. In the second configuration: water flows through both the first water line and the second water line, foam flows through the second foam line, a foam concentrate-water mixture is passed into the first manifold, and pure water is passed into the second manifold.

In another independent aspect, the invention provides a method of operating a fire suppression system. The method comprises operating the fire suppression system in a first configuration. In the first configuration, foam concentrate is pumped to an upstream side of a water pump, and a foam concentrate-water mixture is discharged from the water pump and into at least one of a plurality of manifolds. The method comprises shifting the fire suppression system from the first configuration to a second configuration in which pumping of foam concentrate to the upstream side of the water pump is stopped and in which foam concentrate is pumped to a downstream side of the water pump. The method comprises operating the fire suppression system in the second configuration whereby a portion of the water pumped from the water pump is combined with foam concentrate to supply a first one of the plurality of manifolds, and another portion of the water pumped from the water pump is provided without foam concentrate to supply a second one of the plurality of manifolds.

DETAILED DESCRIPTION

Before any embodiments of the present invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
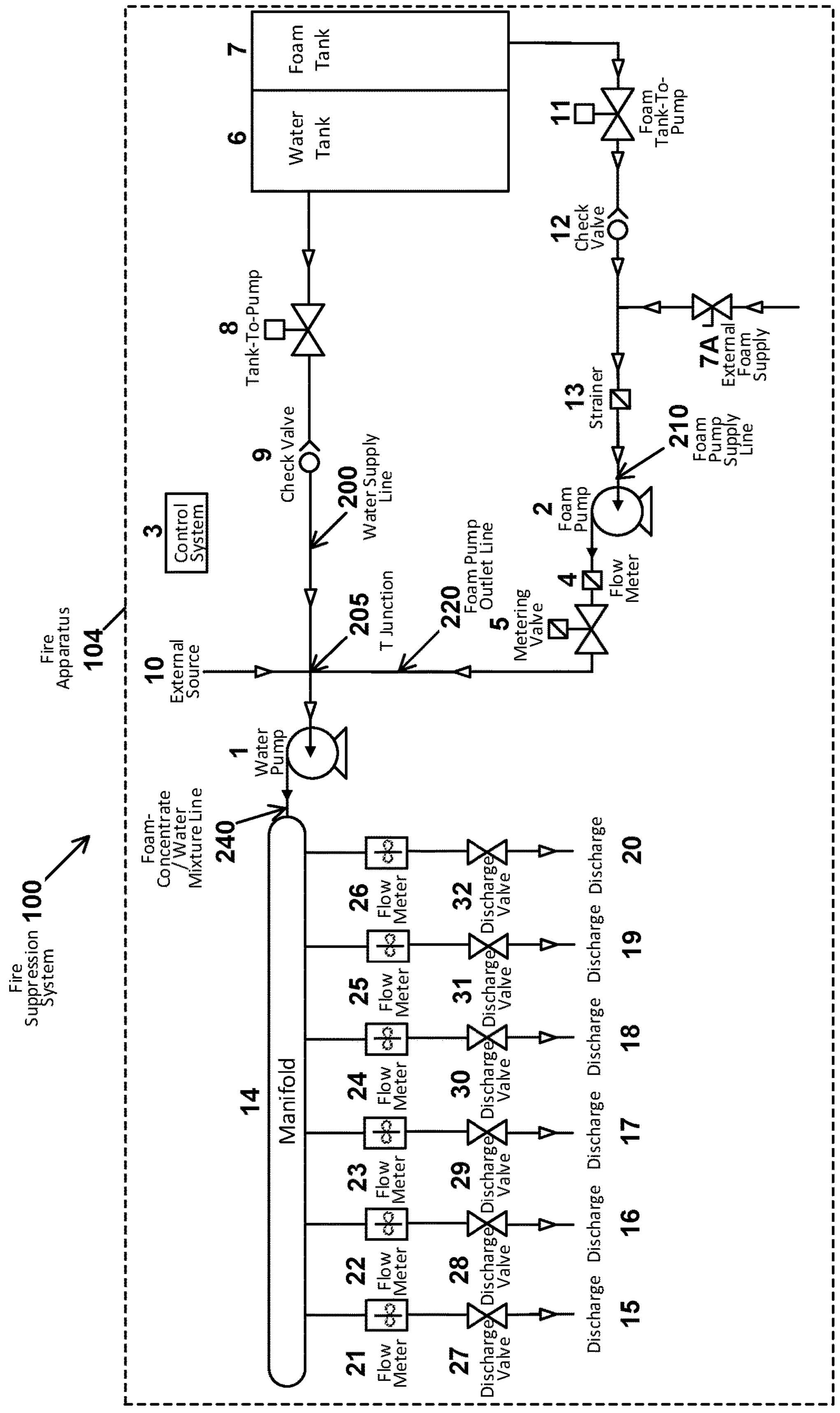
FIG. 1 is a schematic view of a first fire suppression system with injection of foam concentrate prior to a water pump.

FIG. 1 illustrates a fire suppression system 100 where foam concentrate is introduced to the water flow prior to a water pump. The fire suppression system 100 may be, for example, installed in a fire apparatus 104 such as a firefighting vehicle (e.g., a fire truck) or may be a stationary system used in a building. The system includes a water pump 1 and a foam pump 2. The water pump 1 and the foam pump 2 are powered either by the same prime mover (e.g., a single internal combustion engine with two power take offs) or by separate prime movers. A control system 3 communicates with flow meters 21-26, a metering valve 5, and the prime mover or prime movers powering the water pump 1 and the foam pump 2 to control the operating status of the water pump 1 and the foam pump 2, and ultimately, the volumetric flow rate of water and foam concentrate in the system. A foam concentrate flow meter 4 and metering valve 5 are located adjacent the outlet of the foam pump 2. The outlet of the foam pump 2 then connects to a water supply line 200 coupled to the inlet side of the water pump 1. A water tank 6 supplies water to the water pump 1 through the water supply line 200. A foam tank 7 supplies foam concentrate to the foam pump 2. In some embodiments, and as shown in FIG. 1, the outlet of the foam pump 2 is fluidly connected to the water supply line 200 between the water tank 6 and the water pump 1. In other embodiments, the outlet of the foam pump 2 may be otherwise fluidly connected to an inlet side of the water pump 1.

Water is supplied to the water pump 1 and foam concentrate is supplied to the foam pump 2. In some embodiments, water flows from the water tank 6 through a tank-to-pump valve 8 and a check valve 9 before entering the intake side of the water pump 1. In some embodiments, water flows from the water tank 6 to the tank to pump valve 8 at atmospheric pressure. Alternately, water flows from an external source 10 to the intake side of the water pump 1. Foam concentrate flows either from the foam tank 7 through a foam tank-to-pump valve 11 and a check valve 12 or from an external foam supply 7A. Foam concentrate then flows through a strainer 13 before entering the intake side of the foam pump 2.

Foam concentrate flows at pressure out of the foam pump 2 and through a foam concentrate flowmeter 4 and a metering valve 5 before being introduced to the water supply line 200 or otherwise introduced to the inlet side of the water pump 1. A foam pump supply line 210 fluidly communicates between at least one of the foam tank 7 and an external foam concentrate supply 7A and the inlet side of the foam pump 2. A foam pump outlet line 220 fluidly communicates between the outlet of the foam pump 2 and the water supply line 200 between the water tank 6 and the water pump 1. Alternatively, the foam pump outlet line 220 fluidly communicates between the outlet of the foam pump 2 and an inlet side of the water pump 1. The water and foam concentrate is mixed at or prior to the water pump 1 intake to become a foam solution. A foam-concentrate/water mixture exits the water pump 1 at pressure and enters a discharge manifold 14. The foam-concentrate/water mixture is distributed from the discharge manifold 14 to the various discharge outlets 15-20 on the fire apparatus (not shown). The fire apparatus 104 may be, but is not limited to: a fire truck, a stationary fire suppression system found in a building, and a hand-held fire suppression device such as a fire extinguisher.

The desired foam-concentrate/water mixture concentration is maintained by the control system 3, which compares the output from the foam concentrate flowmeter 4 to the sum of the discharge flow meters 21-26. The foam concentrate flowmeter 4 measures a total foam concentrate flow rate through the foam pump outlet line 220. The discharge flow meters 21-26 combine to measure a total mixture flow rate of the foam-concentrate/water mixture as it is discharged from the system 100. The control system 3 varies the amount of foam concentrate supplied to the manifold 14 by adjusting the foam concentrate metering valve 5 and/or adjusting the operating rate of the foam concentrate pump 2 to maintain the desired foam solution concentration level. The control system 3 may also be capable of other methods of adjusting the mixture concentration. Adjusting the operating rate of the foam concentrate pump 2 may include, but is not limited to adjusting the amount of power supplied to the foam concentrate pump 2. Adjusting the operating rate (i.e., operating status) of the foam concentrate pump 2 adjusts the volumetric flow rate of foam concentrate from the foam tank 7 to the inlet of the water pump 1 and ultimately to the manifold 14 and out the discharge outlets 15-20. This adjusts the foam-concentrate/water mixture concentration. Foam-concentrate/water mixture can be retained at pressure in the manifold 14 for discharge out of the discharge outlets 15-20 when any of the discharge valves 27-32 are opened.

Discharge valves 27-32 are located downstream of the flow meters 21-26, and are opened and closed to control the flow of the mixture out of the system through the discharge outlets 15-20. As discharge valves 27-32 are opened or closed, the total discharge flow out of the system will change. The control system 3 will continue to vary the foam concentrate metering valve 5 and/or the operating rate of the foam concentrate pump 2 to keep the foam-concentrate/water mixture concentration at the desired level.

In this embodiment, the foam pump 2 power is reduced by as much as 400 percent compared to conventional direct foam injection systems that require foam delivery at high pressure on the downstream side of the water pump. This allows more power to be used by the water pump 1. As a result, the system realizes an increased maximum foam-concentrate/water mixture discharge flow rate, which increases the firefighting capability of the system.

Figure 2:
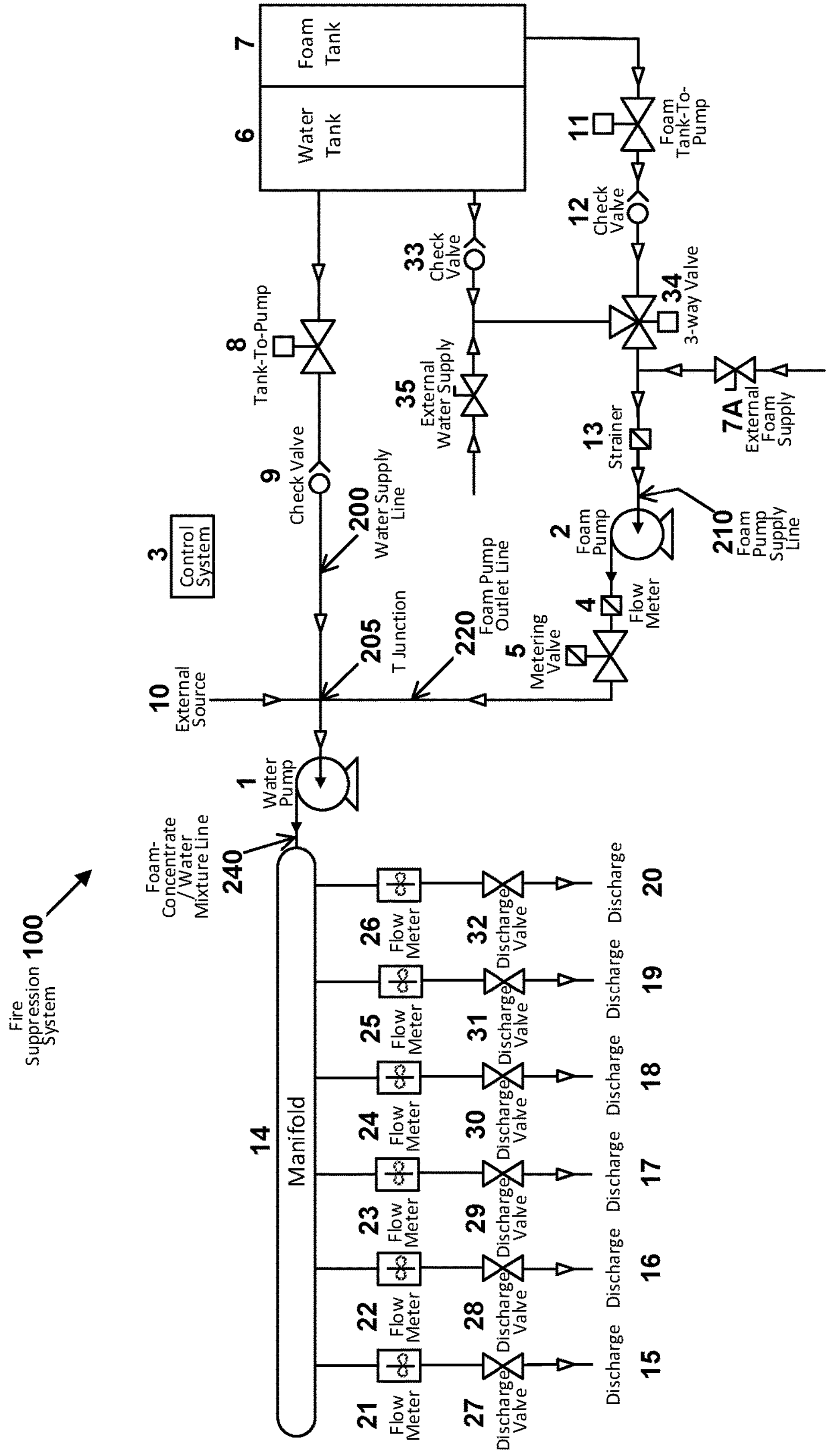
FIG. 2 is a schematic view of a second fire suppression system with injection of foam concentrate prior to a water pump and having the capability to test the foam pump using water.

FIG. 2 illustrates a second embodiment that includes all the elements of the fire suppression system 100 described in FIG. 1 (i.e., the first embodiment) but adds a three-way valve 34 providing the capability of testing the accuracy of the foam proportioning system without flowing foam concentrate. In other embodiments, the three-way valve 34 may be replaced by a valving arrangement including at least one valve where the valving arrangement provides the capability of testing the accuracy of the foam proportioning system without flowing foam concentrate. The valving arrangement may comprise multiple valves. An auxiliary water supply line from the water tank 6 provides water through a check valve 33 and into the three-way valve 34. Water may also be introduced into the three-way valve 34 through the external source 10. During a test cycle, the three-way valve 34 is switched to direct water rather than foam concentrate into the foam concentrate pump 2. External flow measuring devices (not shown) and methods can then be employed to verify the accuracy of the foam concentrate flow meter 4 and the discharge flow meters 21-26. Such external flow measuring devices may be applied bypassing the foam concentrate flow meter 4 and/or external to the discharge outlets 15-20. Other external flow measuring devices and methods are possible. In this embodiment, required annual testing of the system can be performed without discharging foam solution into the environment, performing foam discharge remediation, or incurring the expense of wasted foam concentrate.

Figure 3:
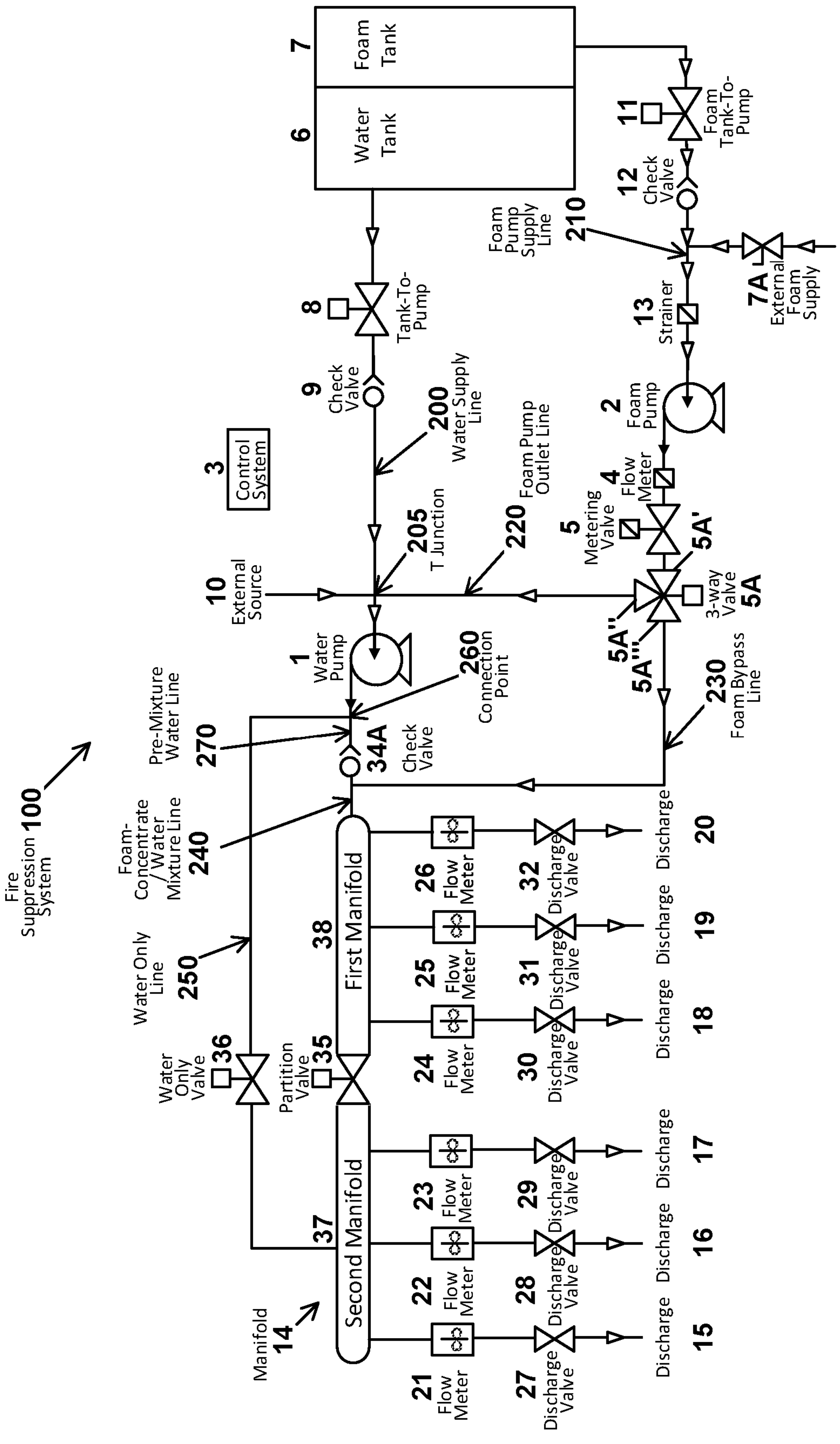
FIG. 3 is a schematic view of a third fire suppression system with injection of foam concentrate prior to a water pump and having the option to simultaneously and separately discharge two types of fluid.

FIG. 3 illustrates a third embodiment that includes all the elements of the fire suppression system 100 described in FIG. 1 (i.e., the first embodiment) but adds the ability to shift the fire suppression system 100 to another configuration to discharge a foam-concentrate/water mixture through some discharge outlets 15-20 while others of the discharge outlets 15-20 are discharging water. Discharging through the discharge outlets 15-20 is controlled through the operation of the discharge valves 27-32.

This embodiment includes a three-way valve 5A with a first passageway 5A' in fluid communication with the outlet of the metering valve 5, a second passageway 5A" in fluid communication with or upstream of the inlet of the water pump 1 (e.g., at a "T" or "tee" junction 205 upstream of the water pump 1), and a third passageway 5A"' not in fluid communication with an upstream portion of or an inlet of the water pump 1. The second passageway 5A" is in fluid communication through the foam pump outlet line 220 which outlets to the water supply line 200. The third passageway 5A"' is in fluid communication with a foam bypass line 230 which receives foam from the foam pump 2, bypasses the water pump 1, and outlets to a foam-concentrate/water mixture line 240. The foam-concentrate/water mixture line 240 is downstream of the water pump 1 and in fluid communication with a first manifold 38 of the manifold 14.

Shifting the operating position of the three-way valve 5A permits the fire suppression system 100 to be shifted between a first configuration and a second configuration. With the three-way valve 5A receiving foam concentrate from the foam pump 2 at the first passageway 5A' and having the third passageway 5A"' closed, foam concentrate is passed through the three-way valve 5A, through the foam pump outlet line 220, and into the water supply line 200. This forms a first foam concentrate line. With the three-way valve 5A receiving foam concentrate from the foam pump 2 at the first passageway 5A' and having the second passageway 5A" closed, foam concentrate is passed through the three-way valve 5A, through the foam bypass line 230, and into the foam-concentrate/water mixture line 240. This forms as a second foam concentrate line.

A check valve 34A is positioned between the foam-concentrate/water mixture line 240 and the outlet of the water pump 1. The check valve 34A prevents foam concentrate backflow towards the water pump 1 and the water-only portion of the system located upstream of the check valve 34A.

A partition valve 35 can be opened or closed to split the manifold 14 into the first manifold 38 and a second manifold 37. The foam-concentrate/water mixture line 240 is in fluid communication with the first manifold 38. A water-only line 250 is in fluid communication at a connection point 260 between an outlet or downstream side of the water pump 1 (located prior to the check valve 34) and the second manifold 37. A pre-mixture water line 270 is located upstream of the check valve 34 and downstream of the connection 260 between the water-only line 250 and the outlet or downstream side of the water pump 1. The pre-mixture water line 270 fluidly connects the outlet of the water pump to the foam-concentrate/water mixture line 240. Other similar configurations may be possible. Such a configuration permits water to flow through the pre-mixture water line 270 (i.e., a first water line), through the water-only line 250 (i.e., a second water line), or through both the pre-mixture water line 270 and the water-only line 250.

In this embodiment, the operator can choose to flow a foam-concentrate/water mixture out of each the discharge outlets 15-20 by directing the foam concentrate into the intake of the water pump 1. This is one configuration of the third embodiment. This configuration is achieved by switching the three-way valve 5A (i.e., closing the third passageway 5A"' of the three-way valve 5A). Optionally, the partition valve 35 within the manifold 14 can be opened. Optionally, a water-only valve 36 can be open or closed depending on which type of fluid the operator wants to supply to the first manifold 38, the second manifold 37, or the entire manifold 14. Alternatively, other valve arrangements can replace the water-only valve 36 to supply fluid to portions of the manifold 14 depending on the operators intended use. Such other valve arrangements may include, but are not limited to: removing the water only valve 36, placing a three-way valve at the connection point 260, or providing a series of valves between the connection point and both the water-only line 250 and the pre-water mixture line 270. The second passageway 5A" of the three-way valve 5A fluidly communicates with the inlet or upstream side of the water pump 1 which receives water from the water tank 6 or the external water source 10. Water is mixed with foam concentrate upstream or at an inlet of the water pump 1. The foam-concentrate/water mixture passes over the check valve 34 and into the first manifold 38. Optionally, the foam-concentrate/water mixture passes through the partition valve 35 and into the second manifold 37. Any of the discharge valves 27-32 can then discharge the foam-concentrate/water mixture from the manifold 14.

Alternately, the operator can choose to flow a foam-concentrate/water mixture out of any one of the discharge outlets 18-20 communicating with the first manifold 38, while flowing pure water (i.e., water without foam concentrate) out of any one of the discharge outlets 15-17 communicating with the second manifold 37. This is another configuration of the third embodiment. Pure water can be retained at pressure in the second manifold 37 for discharge when any one of the discharge valves 27-29 is opened. Foam-concentrate/water mixture can be retained at pressure in the first manifold 38 for discharge when any one of the discharge valves 30-32 is opened.

To achieve this, the operator closes the partition valve 35, opens the water-only valve 36, and switches the three-way valve 5A (i.e., closing the second passageway 5A" of the three way valve 5A) to direct the foam concentrate flow through the foam bypass line 230 and into to the foam-concentrate/water mixture line 240. As a result, foam concentrate from the foam pump 2 and water from the water pump 1 are both supplied to the foam-concentrate/water mixture line 240 to supply the first manifold 38. The water and foam-concentrate is mixed in the first manifold 38 to become a foam-concentrate/water mixture. Mixing may also occur in the foam-concentrate/water mixture line 240 prior to the first manifold 38. Check valve 34A prohibits foam concentrate from the foam pump 2 and foam-concentrate/water mixture from the first manifold 38 from flowing backwards into the water-only side of the system. Foam-concentrate/water mixture is distributed from the first manifold 38 to the various discharge outlets on the fire apparatus 18-20. Water passes through both the pre-mixture water line 270 and the water-only line 250.

The desired foam-concentrate/water mixture concentration is maintained by the control system 3, which compares the output from the foam concentrate flowmeter 4 to the sum of the discharge flow meters 24-26. The control system 3 then varies the amount of foam concentrate supplied to the manifold 14 by adjusting the foam concentrate metering valve 5 and/or the operating rate of the foam concentrate pump 2 to maintain the desired foam solution concentration level.

In this embodiment, the discharge valves 30-32 communicate with the first manifold 38, and the discharge valves

27-29 communicate with the second manifold 37. As discharge valves 30-32 are opened or closed, the total foam-concentrate/water mixture discharge flow will change and the control system 3 will continue to vary the foam concentrate metering valve 5 and/or the operating rate of the foam concentrate pump 2 to keep the foam-concentrate/water mixture concentration at the desired level. At the same time, water from the water pump 1 can flow through the water-only valve 36 to the second manifold 37, through the flow meters 21-23, through the discharge valves 27-29, and out the discharge outlets 15-17. In this embodiment the operator has the choice of either flowing the foam-concentrate/water mixture out of all the outlets, or the foam-concentrate/water mixture out of certain outlets and water out of others, for example simultaneously.

Figure 4:
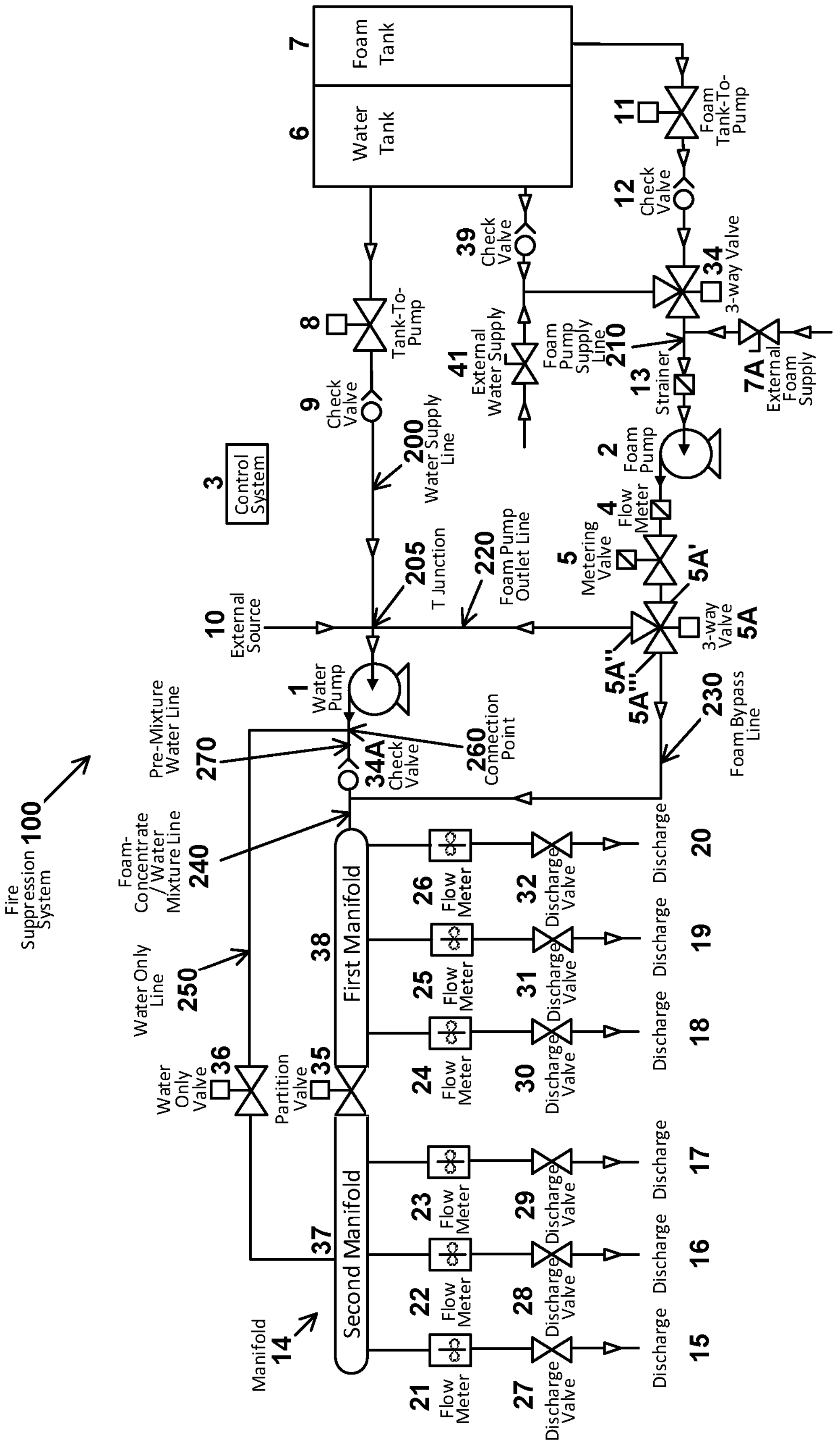
FIG. 4 is a schematic view of a fourth fire suppression system with injection of foam concentrate prior to a water pump and having the combination of the capability to test the foam pump using water and the option to simultaneously discharge two types of fluid.

FIG. 4 illustrates a fourth embodiment that combines all the elements of the fire suppression system 100 described in FIG. 2 (i.e., the second embodiment) with the elements described in FIG. 3 (i.e., the third embodiment). In this embodiment, the operator can choose between flowing the foam-concentrate/water mixture out of all outlets, or flowing the foam-concentrate/water mixture from some outlets and water from others (i.e., the second embodiment). In addition, the operator can test the foam system with water rather than with foam concentrate (i.e., the third embodiment). This fourth embodiment provides the beneficial aspects of the first, second, and third embodiments in one package. As illustrated in FIG. 4, the fourth embodiment includes a check valve 39 positioned between the water tank 6 and the three-way valve 34. The check valve 39 may inhibit backflow of fluid into the water tank 6. The fourth embodiment also optionally includes an external water supply 41 in fluid communication with the three-way valve 34. The external water supply 41 may supply water to the fire suppression system 100 upstream of the three-way valve 34.

Figure 5:
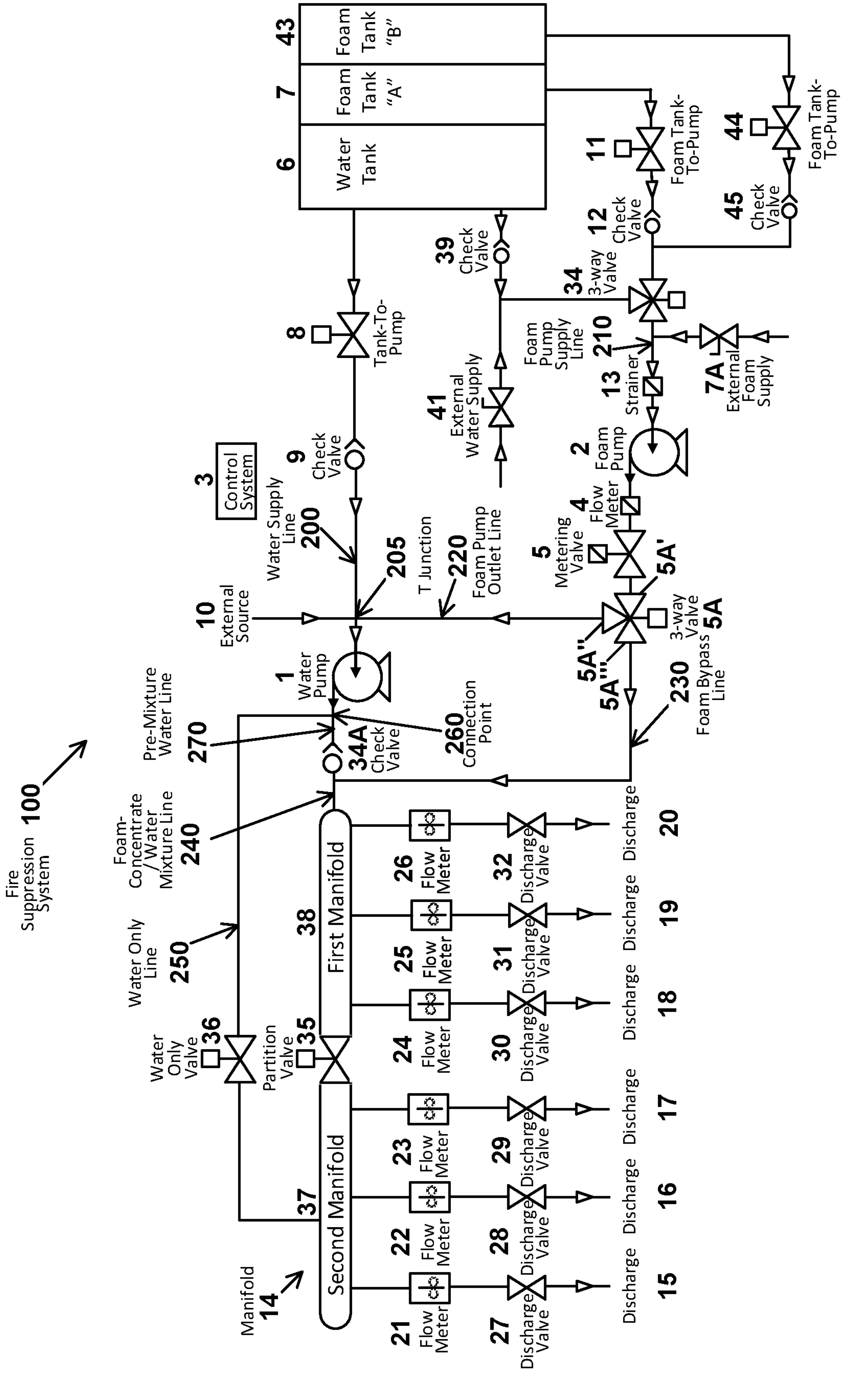
FIG. 5 is a schematic view of a fifth fire suppression system with injection of foam concentrate prior to a water pump and having the capability to select between a first foam concentrate supply and a second foam concentrate supply.

FIG. 5 illustrates a fifth embodiment that includes all the elements of the fire suppression system 100 described in FIG. 4 (i.e., the fourth embodiment) but adds an additional foam concentrate tank 43, a second foam tank to pump valve 44 and a second check valve 45. In this embodiment, the operator is able to select from supplying the foam pump 2 with foam concentrate from either the first foam tank 7 or the additional foam tank 43. In some embodiments, the first foam tank 7 is filled with a first type of foam concentrate such as, but without limitation, Class A foam concentrate, and the additional foam tank 43 is filled with a second type of foam concentrate such as, but without limitation, Class B foam. This permits an operator to switch the type of foam supplied to the foam pump 2 by simply manipulating the foam tank-to-pump valve 11 and the second foam tank-to-pump valve 44. In other embodiments, the first foam tank 7 and the additional foam tank 43 contain the same type of foam concentrate. In this configuration, switching of the foam tank-to-pump valves 11, 44 allows selection of foam tank supply to the foam pump. Either the first foam tank 7, the additional foam tank 43, or both the first foam tank 7 and the additional foam tank 43 supply foam concentrate to the foam pump 2.

Figure 6:
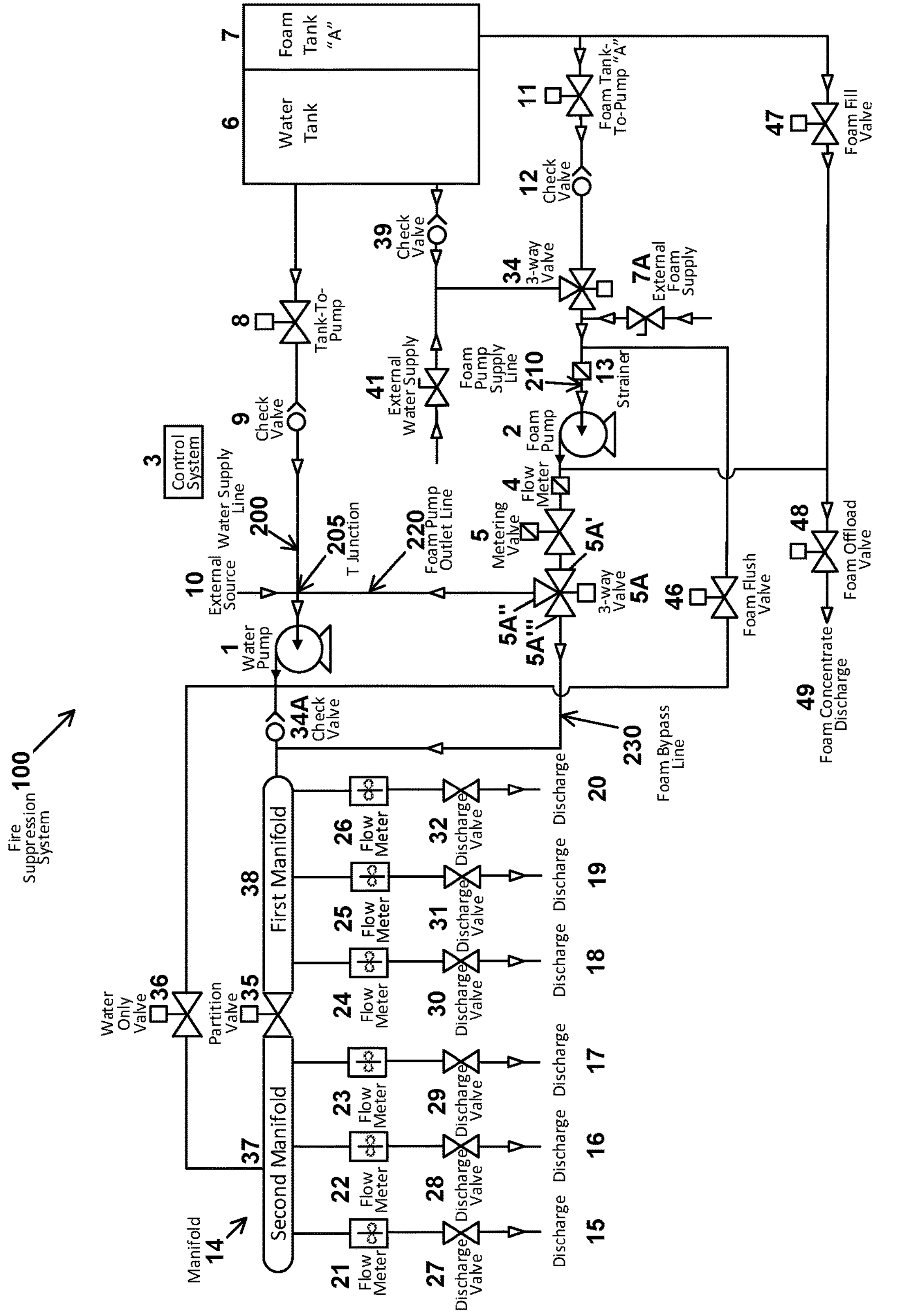
FIG. 6 is a schematic view of a sixth fire suppression system with injection of foam concentrate prior to a water pump and having the ability to flush the system, refill a foam concentrate supply, and off-load a foam concentrate supply.

FIG. 6 illustrates a sixth embodiment that includes all the elements of the fire suppression system 100 described in FIG. 4 (i.e., the fourth embodiment) but with additional features to allow: foam concentrate refilling, flushing, and off-loading.

Figure 9:
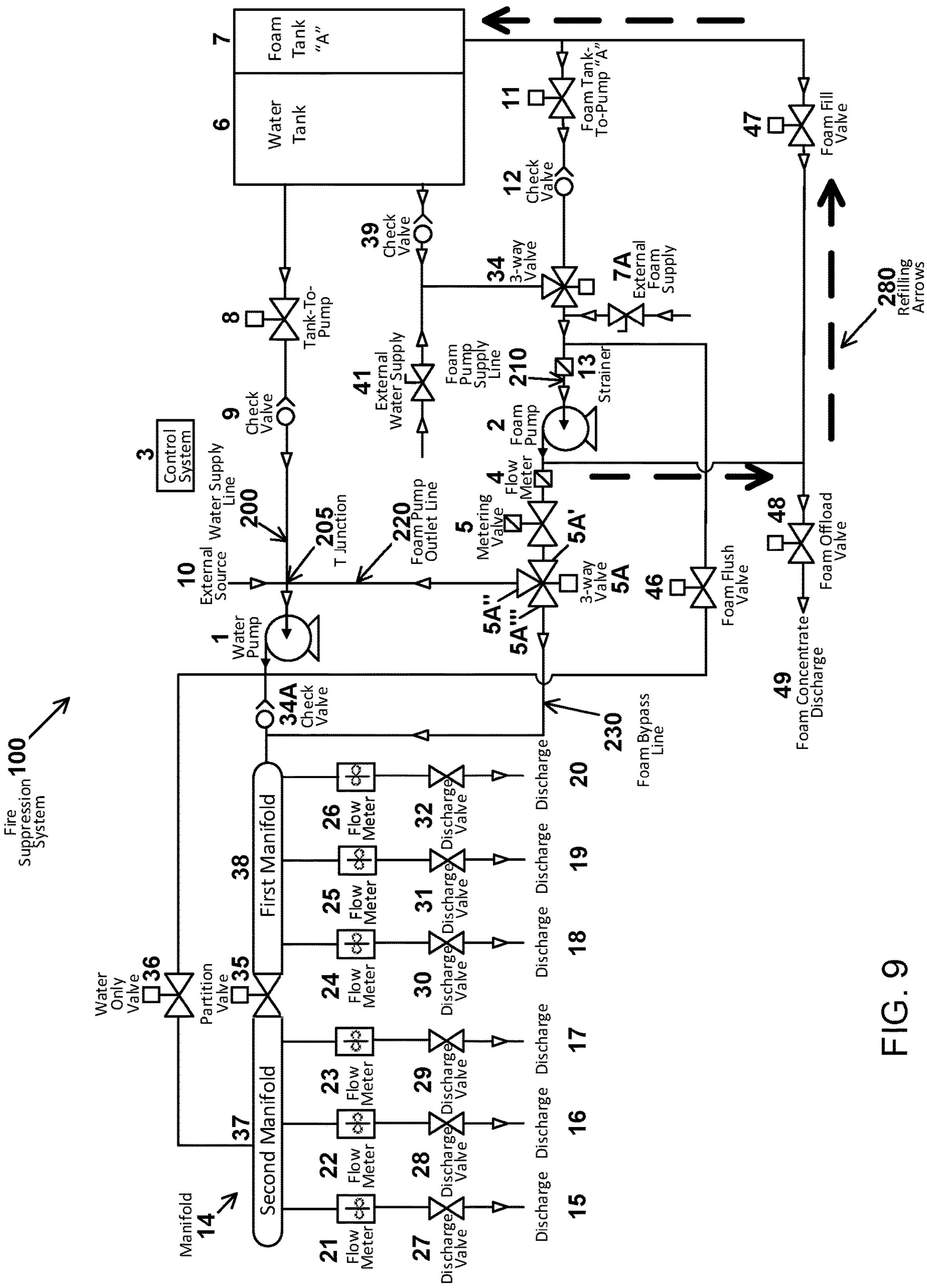
FIG. 9 is a schematic view of the sixth fire suppression system of FIG. 6 having arrows to illustrate refilling.

Foam concentrate refilling (i.e., recovery) is accomplished by pushing foam concentrate from the discharge (i.e., outlet) side of the foam concentrate pump 2 through a foam fill valve 47 and back to the foam tank 7. The fire suppression system 100 capable of foam concentrate refilling is illustrated in FIGS. 6 and 9, with arrows 280 in FIG. 9 illustrating the flow of fluid during refilling. Optionally, foam from the external foam supply 7A is pushed by the foam pump 2 through the fill valve 47 and into the foam tank 7. In refilling of the foam tank 7, foam concentrate is recovered from the foam pump supply line 210. At the end of the refilling operation, a signal may be sent to the control system 3 to indicate the end of the refilling operation and to optionally trigger another operation. Alternatively, manual shifting between modes may be suitable.

Figure 10:
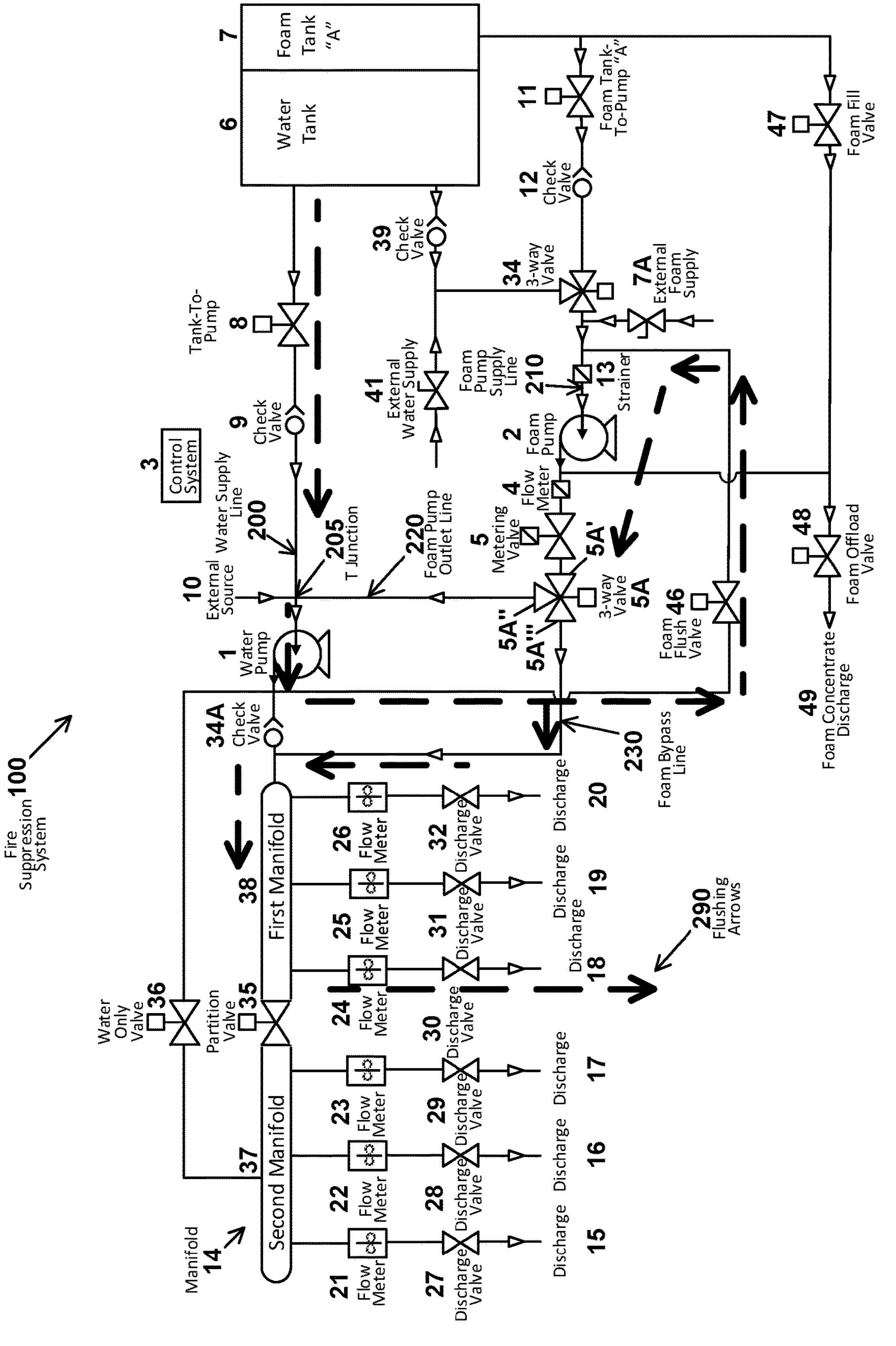
FIG. 10 is a schematic view of the sixth fire suppression system of FIG. 6 having arrows to illustrate flushing.

Foam concentrate flushing is accomplished by pushing water from the outlet side of the water pump 1 through a foam flush valve 46 and back into the foam line supply line 210 prior to the foam pump 2 and upstream of the concentrate strainer 13. The fire suppression system 100 capable of foam concentrate flushing is illustrated in FIGS. 6 and 10, with arrows 290 in FIG. 10 illustrating the flow of fluid during flushing. Water is then passed into either one or both of the foam pump outlet line 220 and the foam bypass line 230 depending on the opened or closed status of the three way valve 5A. Water from the water tank 6 fluidly clings to any foam concentrate within the fire suppression system 100, and the fluid is passed into the manifold 14 for subsequent flushing to the exterior of the fire suppression system 100 by at least one of the discharges 15-20.

Figure 11:
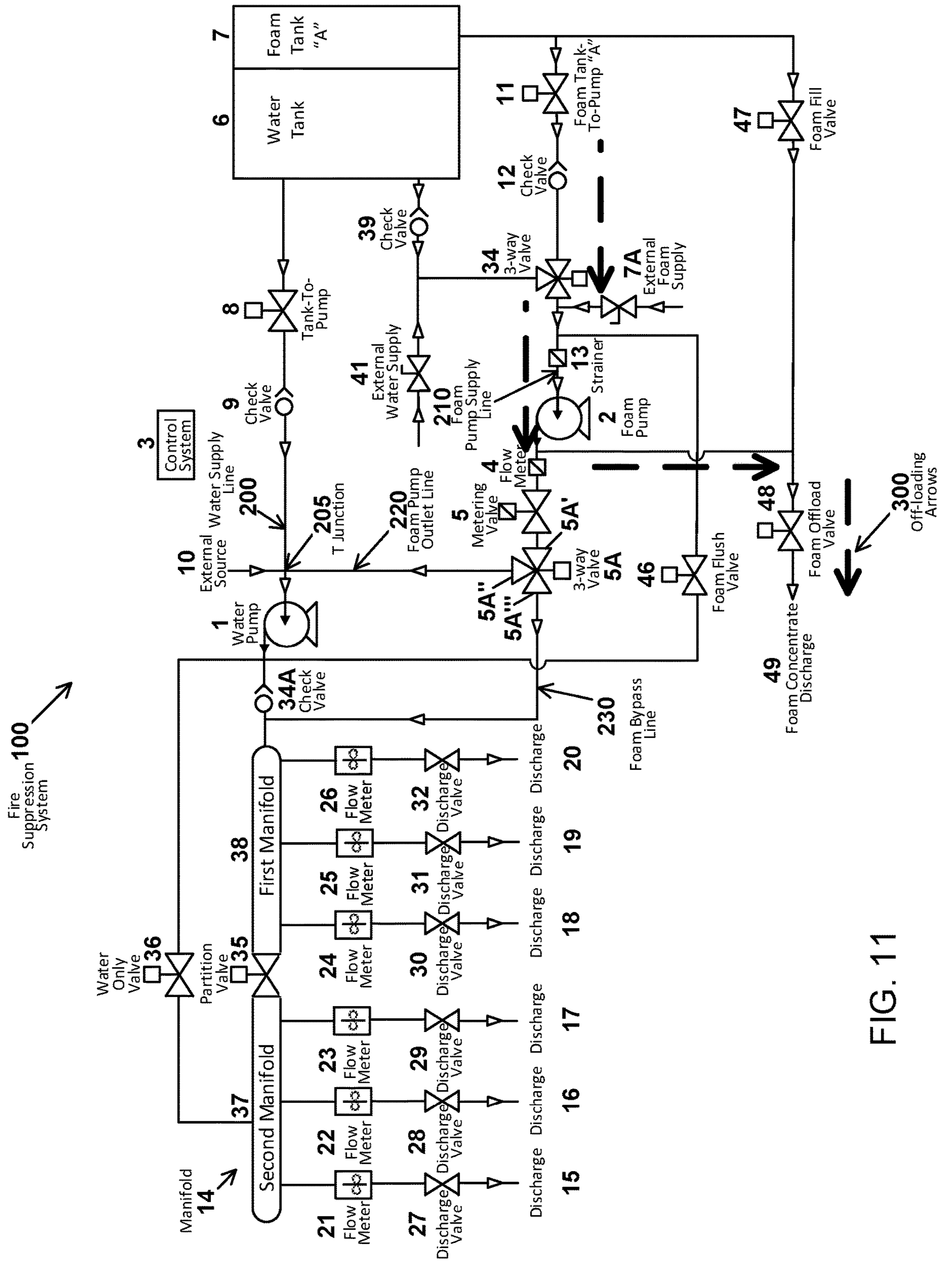
FIG. 11 is a schematic view of the sixth fire suppression system of FIG. 6 having arrows to illustrate off-loading.

Foam off-loading is accomplished by pushing foam concentrate from within the foam pump supply line 210 through the outlet side of the foam concentrate pump 2 and through a foam off-load valve 48 and out a foam concentrate discharge outlet 49. The fire suppression system 100 capable of foam off-loading is illustrated in FIGS. 6 and 11, with arrows 300 in FIG. 11 illustrating the flow of fluid during off-loading. The foam offload valve 48 is distinct from the manifold 14. The foam offload valve 48 and foam concentrate discharge 49 permit off-loading of foam concentrate from the foam tank 7 to the exterior of the foam suppression system without passing through the foam pump outlet line 220, the foam bypass line 230, or the manifold 14. As such, residual losses due to foam concentrate sticking to walls of the foam pump outlet line 220, foam bypass line 230, and manifold 14 can be reduced.

Figure 7:
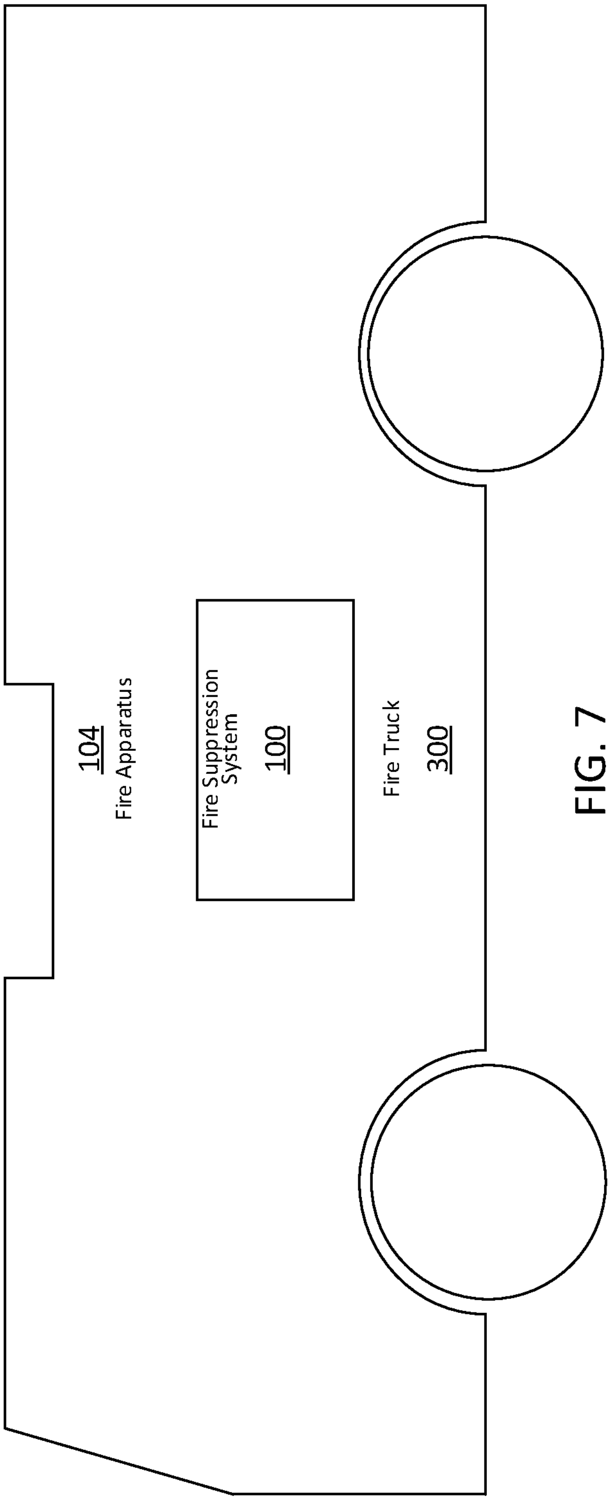
FIG. 7 is a schematic view of the fire suppression system applied within a vehicle.
Figure 8:
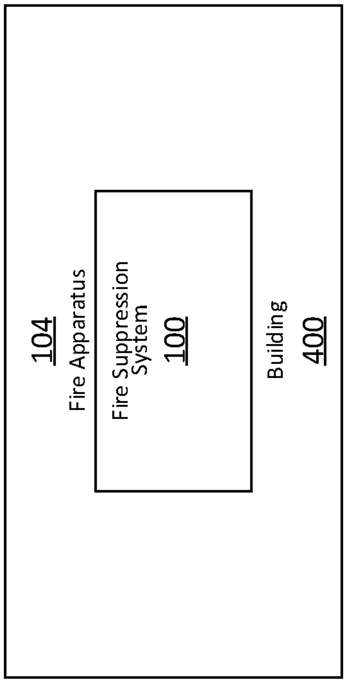
FIG. 8 is a schematic view of the fire suppression system applied within a building.

The fire suppression system 100 may be applied to a number of different fire apparatus 104. FIG. 7 illustrates the above described fire suppression systems 100 applied within a movable fire apparatus 104, such as a fire truck 300. The fire suppression system 100 may be applied to other movable systems fire apparatus 104 such as an all terrain vehicle, a backpack mounted device, or the like. FIG. 8 illustrates the above described fire suppression system 100 applied within a stationary fire apparatus 104 such as a building 400. The fire suppression system 100 may be applied within other stationary systems such as a stand-alone station. The fire suppression system 100 may be applied to smaller scale systems handling smaller volumes of water and foam concentrate when compared to fire trucks 300 and buildings 400. For example, such a fire suppression system may be applied in a personal computer.

One or more independent features and/or advantages of the invention may be set forth in the following claims.

What is claimed is:

1. A fire suppression system comprising:

a water pump having an inlet coupled to a water supply line configured to be in fluid communication with a supply of water;

a foam pump having an inlet configured to be in fluid communication with a supply of foam concentrate;

a first foam line fluidly connecting an outlet side of the foam pump to the water supply line;

a second foam line fluidly connecting an outlet side of the foam pump to a foam concentrate-water mixture line downstream of the water pump;

a first water line fluidly connecting an outlet side of the water pump to the foam concentrate-water mixture line, wherein the foam concentrate-water mixture line has an outlet in fluid communication with a first manifold;

a second water line fluidly connecting the outlet side of the water pump to a second manifold; and a valving arrangement including a valve having a first node connected to the first foam line, a second node connected to the second foam line, and a third node connected to the outlet side of the foam pump;

wherein the fire suppression system is shiftable between a first configuration and a second configuration, wherein in the first configuration:

foam concentrate flows through the first foam line, water flows through the water supply line and mixes with the foam concentrate, and a foam concentrate-water mixture is passed into the first manifold through the foam concentrate-water mixture line; and wherein in the second configuration:

water flows through both the first water line and the second water line, foam concentrate flows through the second foam line, a foam concentrate-water mixture is passed into the first manifold, and pure water is passed into the second manifold;

wherein the valve is shiftable between a first position corresponding with the first configuration and a second position corresponding with the second configuration.

2. The fire suppression system of claim 1, further comprising a flow measuring device, wherein the valving arrangement and the flow measuring device are each in fluid communication with the supply of foam concentrate and the supply of water.

3. The fire suppression system of claim 2, wherein the valving arrangement is shiftable between an operating position and a testing position, wherein when in the operating position, the foam concentrate is passed through the foam pump, and wherein when in the testing position, water is passed through the foam pump.

4. The fire suppression system of claim 3, wherein when in the operating position, the flow measuring device is operable to measure a flow of fluid through the foam pump.

5. The fire suppression system of claim 3, wherein when in the testing position, the flow measuring device is operable to measure a flow of fluid through the foam pump without introducing additional foam concentrate from the supply of foam concentrate.

6. The fire suppression system of claim 1, wherein the first manifold and the second manifold are separated by a partition valve which can be opened or closed to permit fluid communication between the first manifold and the second manifold.

7. The fire suppression system of claim 1, wherein in the first configuration, the foam concentrate-water mixture is discharged from the first manifold.

8. The fire suppression system of claim 1, wherein in the second configuration, the foam concentrate-water mixture is discharged from the first manifold, and pure water is discharged from the second manifold.

9. The fire suppression system of claim 1, further comprising a second supply of foam concentrate and a valving system, wherein the inlet of the foam pump is in fluid communication with the supply of foam concentrate and the second supply of foam concentrate through the valving system, the valving system being opened or closed to supply at least one of the supply of foam concentrate or the second supply of foam concentrate.

10. The fire suppression system of claim 1, further comprising a foam fill valve operable to facilitate refilling of the supply of foam concentrate with foam concentrate within the fire suppression system, the foam fill valve receiving foam concentrate pushed by the foam pump.

11. The fire suppression system of claim 1, further comprising a foam flush valve operable to facilitate flushing of foam concentrate from within the fire suppression system, the foam flush valve receiving fluid pushed by the water pump and introducing the fluid into the foam pump.

12. The fire suppression system of claim 1, further comprising a foam off-load valve and a foam concentrate discharge outlet, the foam off-load valve and foam concentrate discharge outlet receiving fluid from the foam pump for off-loading the fluid from an interior of the fire suppression system to an exterior of the fire suppression system.

13. A method of operating a fire suppression system comprising a water pump having an inlet coupled to a water supply line configured to be in fluid communication with a supply of water;

a foam pump having an inlet configured to be in fluid communication with a supply of foam concentrates;

a first foam line fluidly connecting an outlet side of the foam pump to the water supply line;

a second foam line fluidly connecting the outlet side of the foam pump to a foam concentrate-water mixture line downstream of the water pump;

a first water line fluidly connecting an outlet side of the water pump to the foam concentrate-water mixture line, wherein the foam concentrate-water mixture line has an outlet in fluid communication with a first manifold;

a second water line fluidly connecting the outlet side of the water pump to a second manifold; and a valving arrangement including a valve having a first node connected to the first foam line, a second node connected to the second foam line, and a third node connected to the outlet side of the foam pump;

wherein the fire suppression system is shiftable between a first configuration and a second configuration, wherein in the first configuration:

foam concentrate flows through the first foam line, water flows through the water supply line and mixes with the foam concentrate, and the foam concentrate-water mixture is passed into the first manifold through the foam concentrate-water mixture line; and wherein in the second configuration:

water flows through both the first water line and the second water line, foam concentrate flows through the second foam line, the foam concentrate-water mixture is passed into the first manifold, and pure water is passed into the second manifold;

wherein the valve is shiftable between a first position corresponding with the first configuration and a second position corresponding with the second configuration, the method comprising:

operating the fire suppression system in the first configuration, wherein in the first configuration:
foam concentrate is pumped to an upstream side of the water pump, and
the foam concentrate-water mixture is discharged from the water pump and
into the first manifold;
shifting the fire suppression system by shifting the valve from the first position to the second position in which pumping of foam concentrate to the upstream side of the water pump is stopped and in which foam concentrate is pumped to a downstream side of the water pump; and
operating the fire suppression system in the second configuration whereby a portion of the water pumped from the water pump is combined with foam concentrate to supply the first manifold, and another portion of the water pumped from the water pump is provided without foam concentrate to supply the second manifold.

14. The method of claim 13, further comprising:
shifting the fire suppression system by shifting the valving arrangement from the second configuration to a third configuration whereby pumping of foam concentrate is stopped and in which a flow measuring device is operable to measure the flow of fluid which supplies the first manifold without introducing additional foam concentrate.

15. The method of claim 13, further comprising, when in the second configuration:
discharging the foam concentrate-water mixture from the fire suppression system through a first discharge valve in fluid communication with the first manifold, and
discharging pure water through a second discharge valve in fluid communication with the second manifold.

16. The method of claim 13, further comprising, independent of configuration:
comparing volumetric flow rates between a flowmeter measuring the amount of foam concentrate supplied to the fire suppression system and a plurality of discharge flowmeters measuring the amount of foam concentrate discharged from the fire suppression system through the at least one manifold, and
adjusting the amount of foam concentrate pumped to the upstream side of the water pump based on the comparison.

17. The method of claim 13, further comprising, when in the first configuration:
discharging the foam concentrate-water mixture from the fire suppression system through a first discharge valve in fluid communication with the first manifold.

18. The method of claim 13, further comprising:
shifting the fire suppression system by shifting the valving arrangement from the second configuration to a fourth configuration whereby foam concentrate from within the fire suppression system is pumped to the supply of the foam concentrate.

19. The method of claim 13, further comprising:
shifting the fire suppression system by shifting the valving arrangement from the second configuration to a fifth configuration whereby foam concentrate from within the fire suppression system is flushed by fluid pressure from within the fire suppression system to an exterior of the fire suppression system through at least one of the first manifold and the second manifold.

20. The method of claim 13, further comprising:
shifting the fire suppression system from the second configuration by shifting the valving arrangement to a sixth configuration whereby foam concentrate from within the fire suppression system is off-loaded by fluid pressure from within the fire suppression system to an exterior of the fire suppression system through a dedicated discharge outlet independent of the first manifold and the second manifold.

21. The fire suppression system of claim 1, wherein when the valve is in the first position, the foam concentrate may pass through the outlet side of the foam pump, the third node, and the first node and into the first foam line.

22. The fire suppression system of claim 1, wherein when the valve is in the second position, the foam concentrate may pass through the outlet side of the foam pump, the third node, and the second node and into the second foam line.

* * * * *